United States Patent [19]

Alpers

[11] 3,865,974
[45] Feb. 11, 1975

[54] GRAY-LEVEL ANGLE-GATED ELECTRO-OPTICAL SEEKER

[75] Inventor: Frederick C. Alpers, Riverside, Calif.

[73] Assignee: The United States of America as represented by the Secretary of the Navy, Washington, D.C.

[22] Filed: Feb. 18, 1965

[21] Appl. No.: 434,740

[52] U.S. Cl. ..... 178/6.8, 178/DIG. 21, 250/203 CT
[51] Int. Cl............................ G01s 9/62, H04n 3/00
[58] Field of Search...................... 178/6.8, DIG. 21; 250/203 CTS

[56] References Cited
UNITED STATES PATENTS

| | | | |
|---|---|---|---|
| 2,970,187 | 1/1961 | Hinton | 178/6.8 |
| 3,039,002 | 6/1962 | Guerth | 178/DIG. 21 |
| 3,257,505 | 6/1966 | Van Wechel | 178/6.8 |
| 3,448,271 | 6/1969 | Aldrich et al. | 178/DIG. 21 |

OTHER PUBLICATIONS

Millman et al., "Accurate Linear Bidirectional Diode Gates," In Proceedings of the I.R.E., Vol. 43, No. 1, January 1955, pp. 29-37 relied on.

*Primary Examiner*—Maynard R. Wilbur
*Assistant Examiner*—H. A. Birmiel
*Attorney, Agent, or Firm*—Richard S. Sciascia; Joseph M. St.Amand; T. M. Phillips

[57] ABSTRACT

An electro-optical tracking system which tracks on the gray level of a target of interest. The scene containing the target is focused on the face plate of an imaging tube from which a signal is derived that is gated according to its gray level to provide a memory of target position between scans and for tracking the target as the scene changes.

4 Claims, 4 Drawing Figures

FREDERICK C. ALPERS
INVENTOR.

BY
ATTORNEYS

FREDERICK C. ALPERS
INVENTOR.

ATTORNEYS

GRAY-LEVEL ANGLE-GATED ELECTRO-OPTICAL SEEKER

The invention herein described may be manufactured and used by or for the Government of the United States of America for governmental purposes without the payment of any royalties thereon or therefor.

The present invention relates to electrooptical seekers and more particularly to electro-optical seekers which can automatically track a selected object among other objects or clutter.

There are in existance several different types of electro-optical tracking devices that can be classified in four different groups: edge trackers; edge repellers; center trackers; and correlators. Edge trackers suffer from the disadvantages that a sharp contrast between target and background is required along two orthogonal target edges; because they employ tracking gates which are finite in width, they select the edges of greatest contrast in the vicinity of the target rather than the most desirable tracking point; and the aim point is generally an extremity or corner of the target rather than the target center.

Center trackers which use tracking gates can provide an aim point approximately at the center of a target by simultaneously tracking two opposite edges of the target in each tracking plane. This requires complicated circuitry, and, like the edge tracker, is subject to confusion if points of high contrast exist near, but not on, the target.

Correlators function by comparing the present image of the target scene with an image obtained at a previous time. These systems tend toward complexity, require special components for storage of the image used for comparison, and are ill-suited to tracking a moving target.

The present invention provides an electro-optical tracking system which operates with a conventional electro-optical imaging device, in which a lens is used to focus an image of the scene containing the target on the face plate of an imaging tube. The electrical signal derived by scanning over the imaging tube face plate is processed first through a gating circuit that passes only those portions of the signal which corresponds to areas of the scene having the same gray level as the desired target, and then through additional gating circuits which select only that proper gray level portion which corresponds to a point on the scene that has the approximate angular coordinates of the target. This results in the selection of the signal representing the desired target itself and the derivation of information on the target coordinates within the scene viewed, and it forms a basis both for providing a memory of target position between scans and for tracking the target as the scene changes.

An object of the present invention is to provide an automatic electro-optical tracking system which overcomes the above mentioned disadvantages of known systems.

Another object of the invention is to provide an electro-optical tracking system which tracks on the center of the target making use of the degree of relative brightness of the target image.

Other objects and many of the attendant advantages of this invention will become readily appreciated as the same becomes better understood by reference to the following detailed description when considered in connection with the accompanying drawings wherein.

Figure 1:
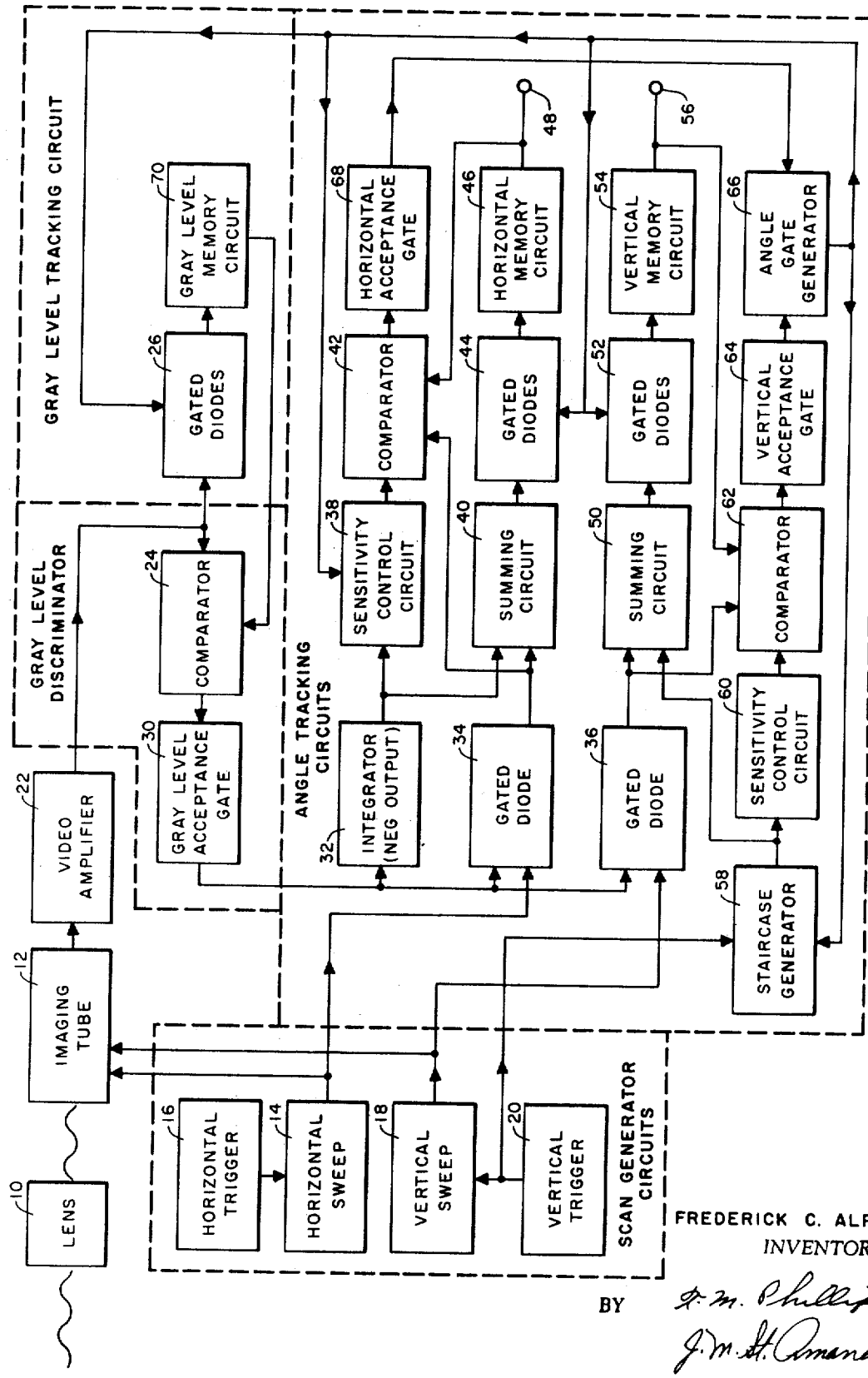
FIG. 1 is a block diagram of an electro-optical tracking circuit embodying the present invention.

Referring now to the drawings, there is shown a lens 10 for focusing a target scene (not shown) on the face plate of an imaging tube 12 such as a vidicon. The scanning of the image tube 12 may be accomplished by using conventional television scan circuitry. Horizontal sweep generator 14, triggered by horizontal trigger circuit 16 provides the horizontal sweep voltage to imaging tube 12 while vertical sweep generator 18, triggered by vertical trigger circuit 20 provides the vertical sweep voltage to imaging tube 12.

The video signal generated by imaging tube 12 is amplified in video amplifier 22 and fed as an input to a comparator circuit 24 and a gated diode circuit 26. The output of comparator 24 is fed to the gray level acceptance gate 30 which feeds inputs to integrator 32, gated diode 34, and gated diode 36. Second inputs for gated diodes 34 and 36 are provided respectively, by horizontal sweep generator 14 and vertical sweep generator 18. The output of integrator 32 feeds into a sensitivity control circuit 38 and into a summing circuit 40. The output of gated diode 34 is fed as a second input to summing circuit 40 and also as an input to comparator 42. The output from summing circuit 40 is fed to gated diodes 44 which provides an output that feeds horizontal memory circuit 46. The output signal from horizontal memory circuit 46 appears at terminal 48 and is the target mean horizontal coordinate.

In a similar manner gated diode 36 feeds into summing circuit 50 that supplies an input to gated diodes 52 which provide an output signal that is fed to vertical memory circuit 54. The output signal from vertical memory circuit 54 appears at terminal 56 and is the target mean vertical coordinate.

Trigger signals generated by vertical trigger generator 20 are fed as a first input to a staircase generator 58. The output of generator 58 is fed to summing circuit 50 and to sensitivity control circuit 60 which provides a first input to a comparator 62. The outputs of gated diode 36 and vertical memory circuit 54 respectively, are fed as second and third inputs to comparator 62. The output from comparator 62 is fed into vertical acceptance gate 64 which provides one of the inputs to angle gate generator 66.

The other input to gate generator 66 is provided by the output from horizontal acceptance gate 68 which is fed by the output signal from comparator 42 which compares the signals from sensitivity control circuit 38, gated diode 34 and horizontal memory circuit 46. The output signal from angle gate generator 66 is fed to gated diodes 26, sensitivity control circuit 38, gated diodes 44, 52 and staircase generator 58. The output output of gated diodes 26 is fed into gray level memory circuit 70 which proides an output signal that is fed to comparator 24.

In operation, conventional scan circuitry may be used in the scan generation circuits of FIG. 1. For a better understanding of the operation of the system of FIG. 1, reference may be made to the waveforms of FIGS. 3 and 4. Conventional manual acquisition is employed to obtain the initial value for the gray memory circuit. The vertical and horizontal sweeps generated cause the electron beam in imaging tube 12 to scan the image in a succession of evenly spaced horizontal lines. The deflection voltages (or currents, if an electromagnetically-deflected imaging tube is used) are supplied to the angle tracking circuits at gated diodes 34 and 36 as well as to imaging tube 12, so that the output voltages representing the target's position within the raster can be derived directly from the voltages controlling the beam position within imaging tube 12 at the instant the beam crosses the target. A vertical trigger pulse is also provided to the angle tracking circuits at staircase generator 58 for reset at the beginning of each new frame of the raster.

Figure 3:
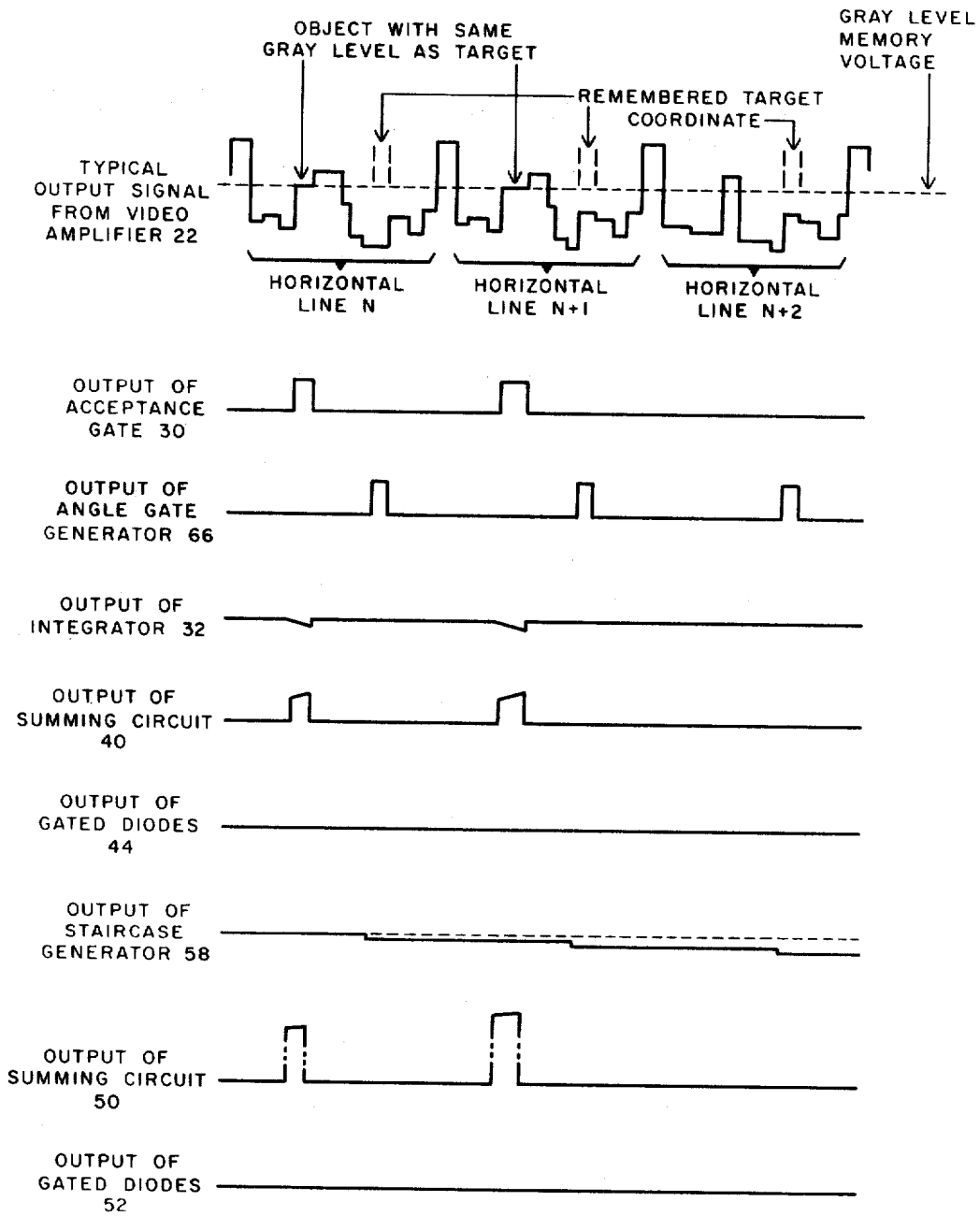
FIG. 3 is a diagram of waveforms showing rejection when signal at remembered target coordinate is not at proper gray level.
Figure 4:
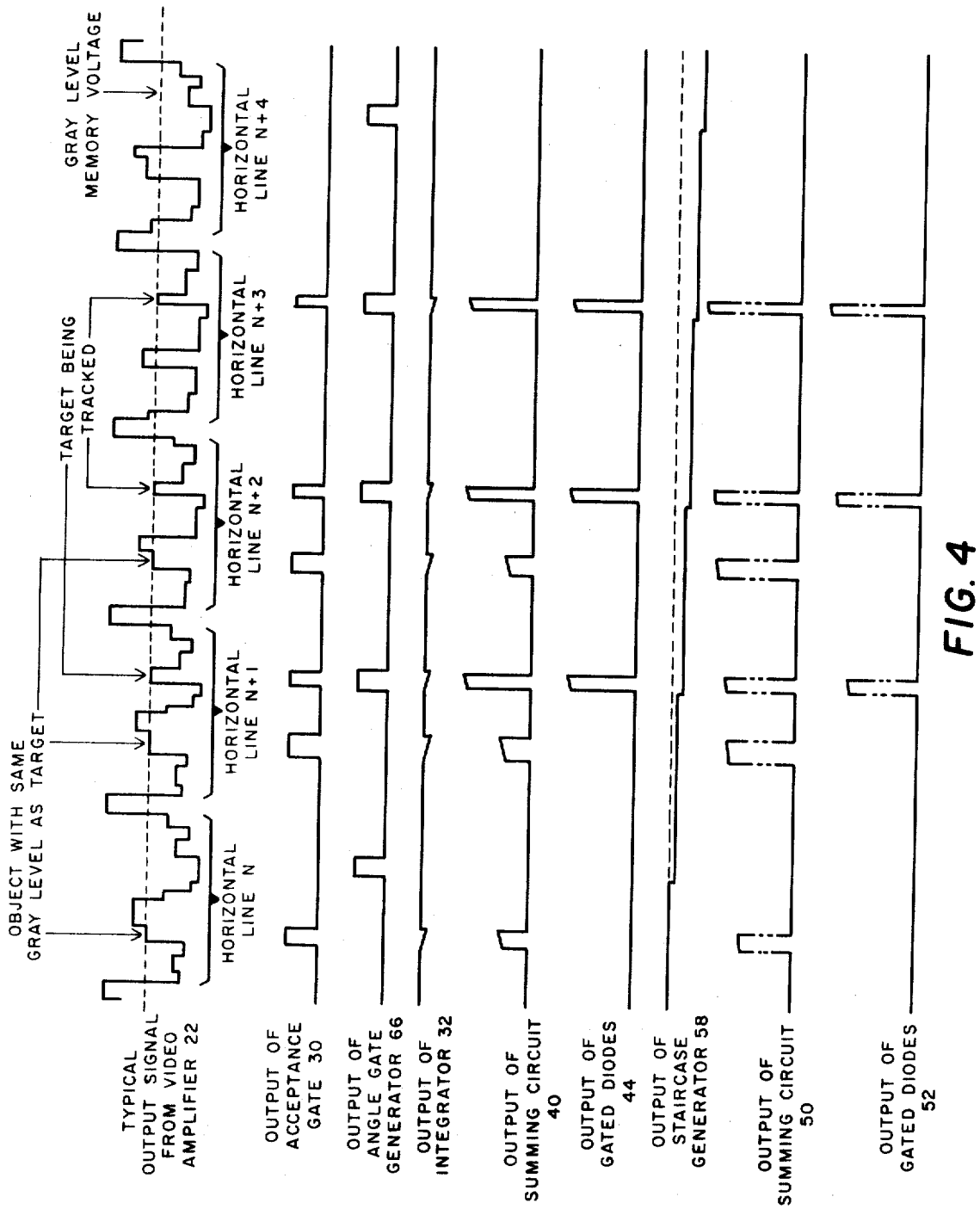
FIG. 4 is a diagram of waveforms showing both target signal and signals from object with same gray level but different coordinates.

As imaging tube 12 is scanned, low-impedance video signals are supplied from video amplifier 22 (as shown in FIGS. 3 and 4) to comparator circuit 24 within the gray-level discriminator and to gated diodes 26 within the gray-level tracking circuits. In the gray-level discriminator, comparator 24 performs the key function of determining whether or not at a given instant the video level, representing the gray level of the specific portion of the image then being scanned, is equal to the gray level memory voltages from memory circuit 70, representing the gray level of the target as remembered from the preceding scanning frame. When the video signal is not equal to the gray level memory voltage within allowable tolerances, comparator 24 generates an output signal that prevents an output signal appearing at the output of gray level acceptance gate 30. As can be seen in FIGS. 3 and 4, there are no output waveforms from acceptance gate 30 except when the gray level of the signal from video amplifier 22 is the same as the gray level memory voltage from gray level memory circuit 70. There are several types of comparator circuits that may be used to perform this function; for example, a comparator consisting of a differential amplifier with the video and memory signals supplied as inputs and with diodes connected in a full wave rectifier manner at the two amplifier outputs to give a unipolarized comparator output whenever the video either exceeded or was exceeded by the memory voltage. Gray level acceptance gate 30 may be an overdriven amplifier or multivibrator controlled by the output signal from comparator 24.

In the gray level tracking circuit, gated diodes 26 are used to isolate gray level memory circuit 70 when no correction signals are to be fed to comparator 24. Gated diodes 26 consist of two diode circuits, connected in parallel but in reverse direction, to permit either adding to or subtracting from the memory voltage of memory circuit 70. Each of these diode circuits may consist of either diodes connected in series or triodes (or transistors) connected as diodes; but in either case each a controlling electrode or electrodes must be switched to block conduction when isolation is desired. Diodes 26 are controlled by the output signal from angle gate generator 66, which permits conduction only at those instants when the gray level, the horizontal position of the scan, and the vertical position of the scan are respectively sufficiently close to the gray level, and the horizontal-vertical coordinate positions remembered for the target.

Gray level memory circuit 70 may be a low-leakage capacitor followed by an electro-meter or tapped cathode follower circuit to supply an output voltage at the exact dc voltage level carried by the capacitor and of sufficient impedance level so as not to drain the capacitor. When the diodes 26 are conducting, the voltage across the capacitor is equal to that of the video signal input from amplifier 22. The memory voltage is thus corrected in accordance with or "tracks," the level of the video signal selected by gate 30. No feedback loop is required since the gray level memory voltage is made equal to the incoming signal representing updated target gray level by connecting the memory storage capacitor to the video signal at the appropriate time by means of gated diodes 26.

The angle tracking circuitry contains separate horizontal and vertical tracking channels, with cross-coupling between the two effected through common angle gate 66. Comparators 42, 62 and acceptance gate circuits 68, 64 are for discrimination purposes, and gated diodes 44, 52 and memory circuits 46, 54 are for tracking purposes. These circuits are similar to their correspondingly named and previously described counterparts in the gray level discriminator and tracking circuit. The input signals are the sweep voltages fed through gated diodes 34, 36, summing circuits 40, 50 to comparators 42, 62, respectively, rather than the video signals. comparators 42, 62 check instantaneous values of sweep voltages against memory circuit voltages representing the past or "tracked" target position. To vary the tolerance allowed by each of comparators 42, 62 in their decision-making function of determining whether the input scan voltages are substantially equal to the target position memory voltages, sensitivity control circuits 38, 60 are provided. In a comparator circuit incorporating a differential amplifier, as comparator 24 described above, this variation can be achieved by controlling the total current fed to the two arms of the circuit, thereby varying the voltage gain of the amplifier to change the amount of difference required between the input memory voltages to obtain an output sufficient to initiate acceptance-gates 68, 64, cut-off action.

The horizontal tracking channel is prevented from functioning except when the gray level is acceptable by controlling gated diode 34. Gated diode 34 is controlled by the output from gray level acceptance gate 30 and only allows horizontal sweep voltage to be fed to summing circuit 40 when the gray level of the input video is approximately the same as the voltage on the gray level memory circuit 70. At all other times there is no input to the horizontal tracking channel. Gated diode 36 performs in exactly the same manner for the vertical tracking as diode 34 functions for the horizontal tracking circuit. Gated diodes 34, 36 may be identical to gated diodes 26 except they need provide for current flow in only one direction.

Center tracking in the horizontal plane is obtained by means of integrator 32 and summing circuit 40. Integrator 32 is controlled by the input from gray level acceptance gate 30 and accumulates voltages passed at a uniform rate, but is discharged quickly as soon as the acceptance gate ceases. Short sawtooth waveforms of uneven duration and amplitude then appear at the output of integrator 32 as the horizontal sweep traces across successive portions of the selected target image or across areas exhibiting the same gray level as the target. Integrator 232 should be designed so that the polarity of its output waveforms is negative (or opposite to that of the sweep voltage used in the horizontal tracking channel) and the charging rate should be one-half that of the sweep voltage. Each output waveform from integrator 32 is summed in suimming circuit 40 (FIGS. 3 and 4) with its respective gated portion of the sweep voltage, thus producing a trapezoidal waveform which begins with a voltage directly related to the horizontal position of the beam in the raster at that instant (the deflection voltage plus zero voltage from integrator 32), which rises at a rate equivalent to one half the rate of scan (the deflection voltage rate change summed with minus one half that rate of change from integrator 32), and which, upon the termination of the gray level acceptance gate, has reached only a peak value related to the center position of the beam within that particular gated position of the sweep.

When the sweep crosses the target being tracked, angle gate generator 66 generates an output signal which turns on gated diodes 44. A voltage is then fed to horizontal memory circuit 46 representing the center coordinate of the target which remains after the scan over the target is complete.

The output from integrator 32 is also fed into sensitivity control circuit 38 which may be a peak detector operating on the output from integrator 32, but only when the signal from gate generator 66 is present which would indicate that the passage of the scanning beam is over the targer rather than some other area which exhibits the same gray level as the target. This peak voltage is retained until the next scanning frame and controls the sensitivity of comparator 42, as previously described, in order that the outer areas of the target as well as the center point may be brought within the angle gate. The gains of sensitivty control 38 and comparator 42 should be such that comparator 42 will accept a new target width which is slightly larger than the preceding one.

Vertical tracking channel differs from the horizontal in that "staircase" generator 58 is used in place of integrator 32. Generator 58 may be one of several types of circuits used as counters or frequency dividers. Generator 58 is reset to zero output by a trigger pulse from vertical trigger generator 20 at the beginning of each frame; thereafter, each time an angle gate appears at angle gate generator 66, generator 58 increases its output by one unit or step. When the vertical dimension of the target image overlaps a number of horizontal scan lines, the ouput waveform of generator 58 has the appearance of a staircase viewed in profile. The output of generator 58 should be of opposite polarity to that of the associated sweep voltage, and increase at one half the rate of the sweep voltage. The output of generator 58 is summed in summing circuit 50 with the gated portions of the vertical sweep waveform to derive a tracking output indicative of the center coordinate of the target in a similar manner as that in the horizontal channel. The output of generator 58 is also fed into sensitivity control circuit 60 which does not have an input from angle gate generator 66 since this function has already been accomplished within generator 58.

Figure 2:
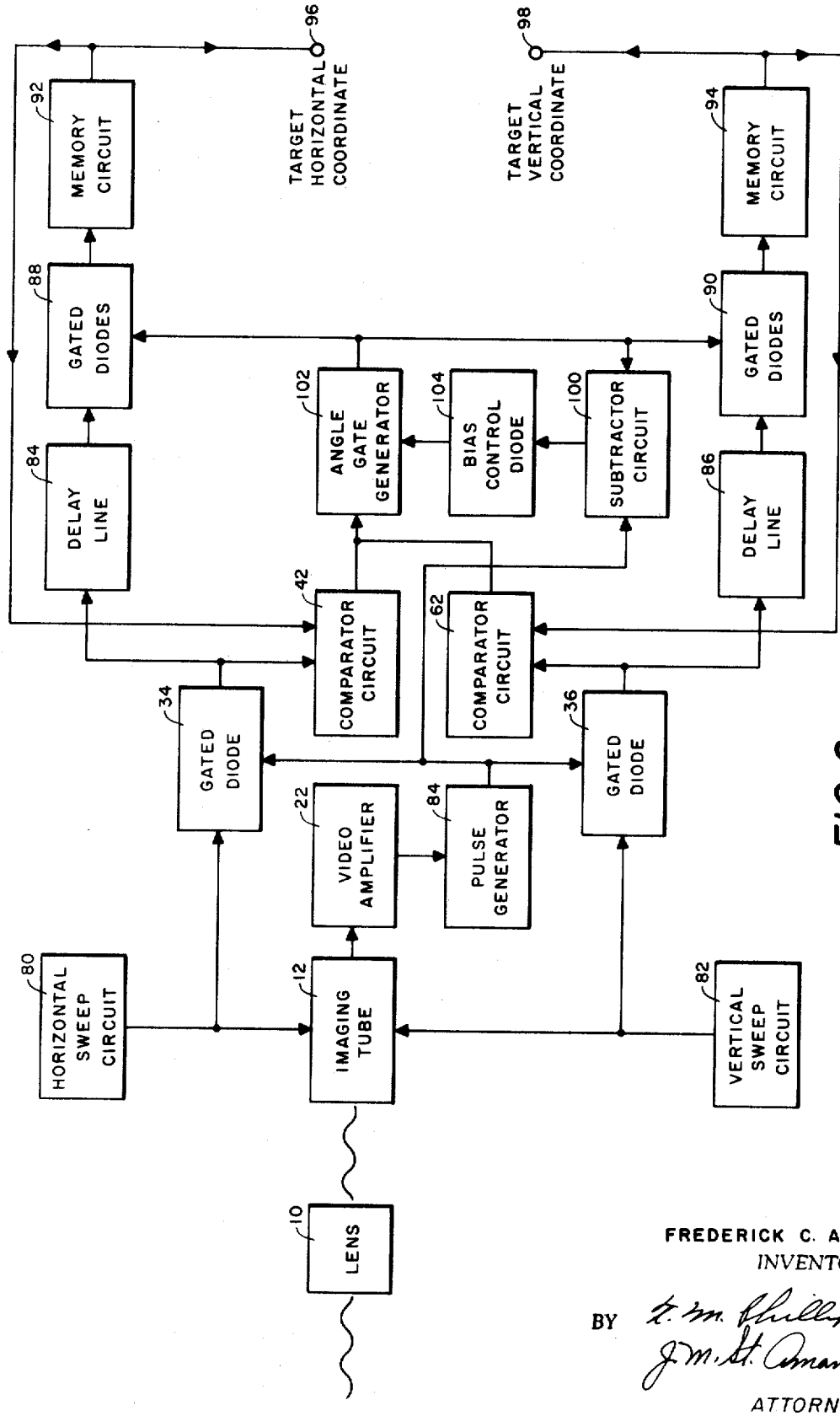
FIG. 2 is a block diagram of a modification of the embodiment of FIG. 1.

In situations where gray level discrimination is not desired, the modification shown in FIG. 2 may be utilized. An example of such a situation would be in tracking a particular aircraft or a star against a uniform background. As shown in FIG. 2, the output from video amplifier 22 is coupled to a pulse generator 72 which will be triggered by video signals having sufficient contrast with the background. The output pulses from pulse generator 72 serves as an input to the angle tracking in the same manner as the output of gray level acceptance gate 30 of FIG. 1.

The modification of FIG. 2 may be used for tracking where the gray level discrimination feature is unnecessary, for example, tracking a particular aircraft or a star against a uniform sky background. Horizontal and vertical sweep voltages are supplied to imaging tube by horizontal sweep circuit 80 and vertical sweep circuit 82, respectively in the conventional manner. The output signal from video amplifier 22 is fed to a pulse generator 84 which feeds pulses to gated diodes 34, 36 respectively when a video signal of sufficient level is received. When gated diodes 34, 36 are turned on by pulses from generator 84, signals from sweep circuits 80, 82 respectively are fed to delay lines 84, 86 and comparator circuits 42, 62. The delayed signals are fed through gated diodes 88, 90 to memory circuits 92, 94 respectively. The output of memory circuit 92 is fed back as an input to comparator 42 and also appears at output terminal and is the target horizontal coordinate. The output of memory circuit 94 is fed back as in input to comparator circuit 62 and also appears at output terminal and is the target vertical coordinate.

The output of pulse generator is also connected as a first input to subtractor circuit 100. Comparator circuits 42, 62 provide outputs to angle gate generator 102 when the difference in the stored signal is sufficiently different from the presently received signal. The output signal is fed to gated diodes 88, 90 and as the second input to subtractor circuit 100.

Subtractor circuit 100 and bias control diode 104 perform a function similar to the sensitivity control circuits in FIG. 1. When pulses from pulse generator 84 indicate that a target is within the field of view but simultaneous pulses from angle gate 102 indicate that no target is being gated, subtractor circuit 100 gives an output to bias diode 104 which relaxes the tolerance on comparator circuit levels required to trigger angle gate generator 102. This makes acquisition of a point target less difficult. When a target is being gated steadily, the tolerance is automatically tightened in order to give the system good discrimination capabilities. In this action, the circuit becomes an adaptive tracking circuit.

Obviously many modifications and variations of the present invention are possible in the light of the above teachings. It is therefore to be understood that within the scope of the appended claims the invention may be practiced otherwise than as specifically described.

What is claimed is:

1. In an electro-optical tracking system, the combination comprising:
   a. an imaging tube,
   b. a lens for focusing an image of the scene containing the target of interest on the face plate of said imaging tube,
   c. scan generation circuit means including a vertical trigger circuit, a horizontal voltage sweep generator and a vertical voltage sweep generator coupled to said imaging tube for electronically scanning the image focused on the face plate of said imaging tube,
   d. gray level tracking circuit means including gray level memory circuit means and first gated diodes coupling said imaging tube to said gray level memory circuit means for passing signals to said gray level memory circuit only when there is a change in the gray level signal from said imaging tube, and producing an output signal that is proportional to the gray level of the target being tracked, e. a gray level discriminating means coupled to said imaging tube and to said gray level tracking circuit means for producing an output signal when the signal received from the imaging tube is the same as the signal received from said gray level tracking circuit means, f. angle tracking circuit means coupled to said scan generation circuit means and to said gray level discriminating means for passing horizontal and vertical scan voltages in response to the signal from said gray level discriminator that represent the horizontal and vertical coordinates of objects having the same gray level as the target of interest and for then selectively passing only those voltages that represent approximately the same coordinates as the coordinates of the target of interest.

2. The system of claim 1 wherein said gray level discriminating means comprises:

a. a gray level acceptance gate having an input and an output, b. a first comparator having a first input coupled to said imaging tube, a second input coupled to said gray level memory circuit and an output coupled to the input of said gray level acceptance gate for generating a blocking signal to said gray level acceptance gate when the signal received from said imaging tube is different from the signal received from said gray level memory circuit.

3. The system of claim 2 wherein said angle tracking circuit means comprises:

a. first gating circuit means coupled to said gray level discriminator and to said horizontal voltage sweep generator for gating the horizontal sweep voltage in response to the gating signal from said gray level discriminator, b. a horizontal coordinate memory circuit having an output voltage that represents the horizontal coordinate of the target being tracked, c. a second comparator circuit coupled to said first gating circuit means and to said horizontal coordinate memory circuit means for generating an output signal when the two signals received by said second comparator are substantially the same, d. an angle gate generator coupled to said second comparator circuit means for generating an output gating signal in response to the output signal from said second comparator circuit, e. second gating circuit means coupled to said first gating circuit means, said angle gate generator and said horizontal coordinate memory circuit for gating the output voltage from said first gating circuit means to said horizontal coordinate memory circuit when a gating signal is received from said angle gate generator, f. third gating circuit means coupled to said vertical sweep generator and to said gray level discriminator for gating the vertical sweep voltage in response to the gating signal from said gray level discriminator, g. a vertical coordinate memory circuit having an output voltage that represents the vertical coordinate of the target being tracked, h. a third comparator circuit coupled to said vertical coordinate memory circuit and to said third gating circuit means for generating an output signal when the two signals received by said third comparator are substantially the same, i. said angle gate generator being coupled to said third comparator circuit for generating an output gating signal in response to the output signal from said third comparator circuit, j. fourth gating circuit means coupled to said third gating circuit means, said vertical coordinate memory circuit means and said angle gate generator for gating the output of said third gating circuit means to said vertical coordinate memory circuit when a gating signal is received from said angle gate generator.

4. The system of claim 2 wherein said angle tracking circuit means comprises:

a. a horizontal channel for generating an output signal that represents the horizontal coordinate of the target of interest and having:

1. a first gated diode having first input coupled to the output of said gray level acceptance gate, a second input coupled to the horizontal sweep generator of said scan generation circuit means, and an output, 2. a first summing circuit having a first input coupled to the output of said first gated diode, a second input and an output, 3. second gated diodes having a first input coupled to the output of said summing circuit, a second input and an output, 4. a horizontal memory circuit having an input coupled to the output of said second gated diodes and an output, b. a vertical channel for generating an output signal that represents the vertical coordinate of the target of interest and having:

1. a second gated diode having a first input coupled to the output of said gray level acceptance gate, a second input coupled to the vertical sweep generator of said scan generation circuit means, and an output, 2. a second summing circuit having a first input coupled to the output of said second gated diode, a second input and an output, 3. second gated diodes having a first input coupled to the output of said second summing circuit, a second input and an output, 4. a vertical memory circuit having an input coupled to the output of said second gated diodes and an output, c. a horizontal coordinate voltage selecting circuit having:

1. an integrator circuit having a charging rate one-half that of the horizontal sweep voltage and having an input coupled to the output of said gray level acceptance gate and an output, 2. circuit means coupling the output of said integrator to the second input of said first summing circuit, 3. a first sensitivity control circuit for controlling the amount of deviation a signal may have from the remembered horizontal coordinate and having a first input coupled to the output of said integrator circuit, a second input and an output,
4. a second comparator circuit having a first input coupled to the output of said first sensitivity control circuit, a second input coupled to the output of said first gated diode, a third input coupled to the output of said horizontal coordinate memory circuit, and an output for producing an output signal when the signal received from said first gated diode is different from that of the signal received from the output of horizontal coordinate memory circuit,
5. a horizontal acceptance gate having an input coupled to the output of said second comparator and an output for producing an output signal except when a signal is received from said second comparator circuit, d. a vertical coordinate voltage selecting circuit having:
1. a staircase generator having a first input coupled to the vertical trigger generator of said scan generation circuit means, a second input and an output,
2. circuit means coupling the output of said staircase generator to the second input of said second summing circuit,
3. a second sensitivity control circuit having an input coupled to the output of said staircase generator and an output,
4. a third comparator circuit having a first input coupled to the output of said second sensitivity control circuit, a second input coupled to the output of said second gated diode, a third input coupled to the output of said vertical coordinate memory circuit and an output for producing an output signal when the signal received from said second gated diode is different from that of the signal received from the output of horizontal coordinate memory circuit,
5. a vertical acceptance gate having an input coupled to the output of said second comparator circuit and having an output for producing an output signal except when a signal is received from said second comparator circuit, e. an angle gate generator for controlling the operation of said first, second and third gated diodes, said staircase generator, and said first sensitivity control circuit and having a first input coupled to the output of said horizontal acceptance gate circuit, a second input coupled to the output of said vertical acceptance gate circuit and an output coupled to second inputs of said first, second, and third gated diodes, said first sensitivity control circuit, and said staircase generator, respectively.

* * * * *